United States Patent
Holloway et al.

(10) Patent No.: US 6,747,996 B2
(45) Date of Patent: Jun. 8, 2004

(54) SYNCHRONIZED TRANSPORT ACROSS NON-SYNCHRONOUS NETWORKS

(75) Inventors: John T. Holloway, Atherton, CA (US); Matthew James Fischer, Mountain View, CA (US); Jason Alexander Trachewsky, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 661 days.

(21) Appl. No.: 09/732,213

(22) Filed: Dec. 7, 2000

(65) Prior Publication Data

US 2001/0030978 A1 Oct. 18, 2001

Related U.S. Application Data

(60) Provisional application No. 60/169,824, filed on Dec. 8, 1999.

(51) Int. Cl.$^7$ .................................................. H04J 3/06
(52) U.S. Cl. ........................................ 370/503; 370/516
(58) Field of Search .......................... 370/401, 503, 370/504, 508, 509, 516, 465

(56) References Cited

U.S. PATENT DOCUMENTS

| | | | |
|---|---|---|---|
| 5,640,388 A | | 6/1997 | Woodhead et al. ......... 370/468 |
| 5,742,649 A | * | 4/1998 | Muntz et al. ............... 370/508 |
| 6,259,677 B1 | * | 7/2001 | Jain ........................... 370/509 |
| 6,327,274 B1 | * | 12/2001 | Ravikanth ................... 370/516 |
| 6,377,588 B1 | * | 4/2002 | Osaki ......................... 370/508 |
| 6,501,809 B1 | * | 12/2002 | Monk et al. ................. 370/504 |
| 6,574,237 B1 | * | 6/2003 | Bullman et al. ............. 370/465 |
| 6,661,811 B1 | * | 12/2003 | Baker ......................... 370/516 |

FOREIGN PATENT DOCUMENTS

| | | |
|---|---|---|
| EP | 0 903 655 | 3/1999 |
| GB | 2 323 225 | 9/1998 |

OTHER PUBLICATIONS

George Minassian, "Home Phone Line Networks: The Next Networking Challenge," *Electronic Product Design*, Nov. 1998, pp. C–15–C21, IML Techpress, UK, (XP000991311).

* cited by examiner

*Primary Examiner*—Salvatore Cangialosi
(74) *Attorney, Agent, or Firm*—Christie, Parker & Hale, LLP

(57) ABSTRACT

A method of providing for synchronizing one or more synchronous terminals with one or more synchronous endpoints, each synchronous terminal and each synchronous endpoint having an asynchronous communications network coupled between at least one synchronous terminal and at least one synchronous endpoint. A synchronization protocol is established between a synchronous terminal and a synchronous end point by providing a gateway between the asynchronous communications network and the synchronous end point, the gateway communicating with the synchronous terminal over the asynchronous communications network in accordance with the synchronization protocol. The synchronization protocol includes sending a message from the gateway to the synchronous terminal, the message containing a timestamp identifying a clock associated with the synchronous end point. The synchronous terminal establishes a clock associated with the synchronous terminal by creating a clock estimate based upon the timestamp message and access jitter expected from the asynchronous communications network such that the clock associated with the synchronous terminal enables packet sampling and transmission onto the asynchronous communications network to and from the synchronous terminal to be synchronized with the clock associated with the synchronous end point.

7 Claims, 17 Drawing Sheets

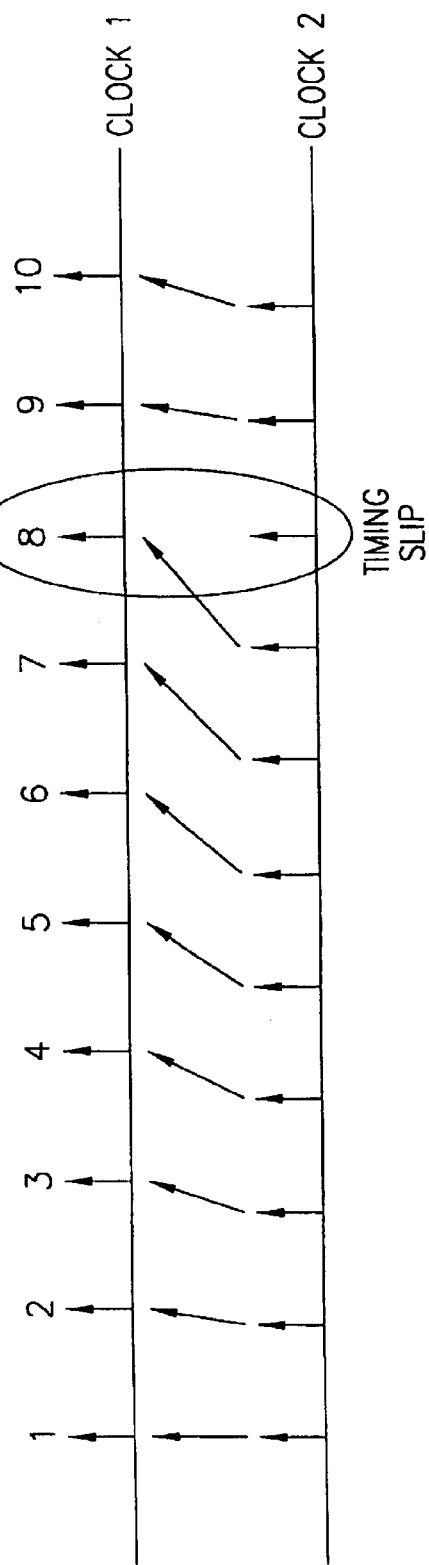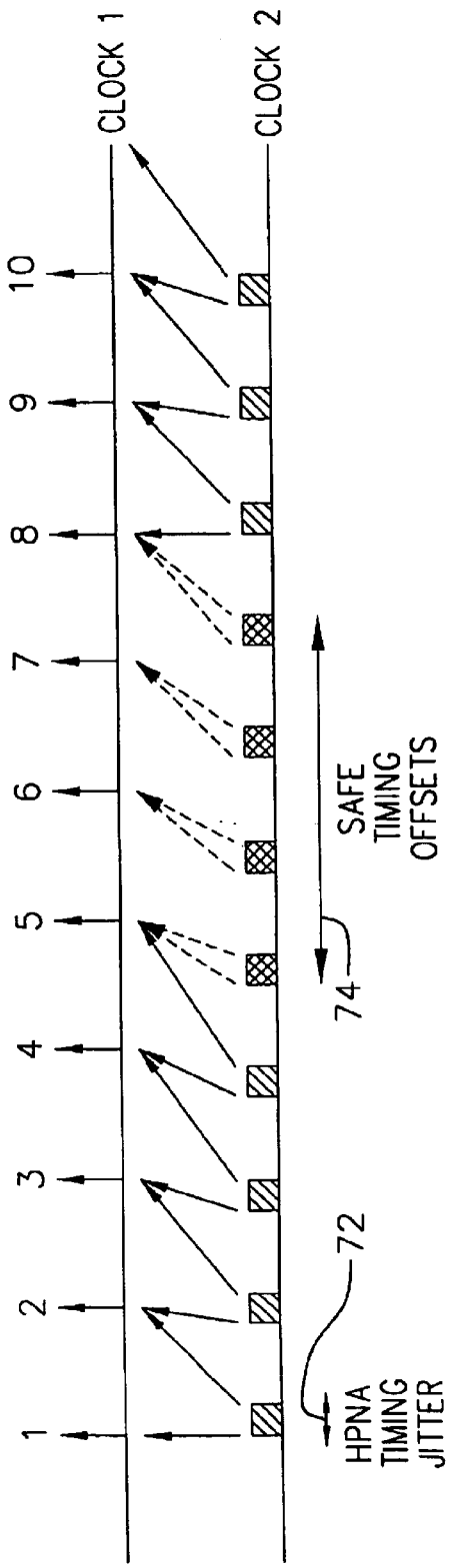

SYNCHRONIZED TRANSPORT ACROSS NON-SYNCHRONOUS NETWORKS

CROSS-REFERENCE TO RELATED APPLICATION(S)

This patent application claims the benefit of the filing date of U.S. Provisional Patent Application No. 60/169,824 filed on Dec. 8, 1999.

BACKGROUND OF THE INVENTION

The present invention relates to the field of communications, and, in particular, a network communications system wherein synchronized voice services are provided to a remote synchronous network over a non-synchronous shared medium LAN integrated with a gateway coupled to the remote synchronous network.

As computers become more and more cost effective for the everyday consumer and for small businesses, such computers become more plentiful for use within local area environments such as homes, office buildings and the like. For example, within a home a person with a computer in the bedroom, and another in the living room, may want to share common files, utilize a common digital subscriber line (DSL), or otherwise transfer information between the computers. Accordingly, various technologies are being developed for computer interconnection of multiple computers located within such environments. One example of such technologies is the Home Phoneline Network Alliance (HPNA) technology for Local Area Network (LAN) computer interconnection which utilizes existing telephone lines within the local environment for the transmission of data packets between the computers. The HPNA technology is implemented in the Broadcom Corporation Model Number BCM 4210 Controller product and is set forth in U.S. patent application Ser. No. 60/196,002 entitled "Home Phone Line Network and Apparatus", the content of which is incorporated by reference herein.

FIG. 1 shows in block diagram form a general home networking environment within which the present invention can be implemented. Home network 10 includes existing (installed) plain old telephone service (POTS) wiring 12, network clients 14, the computer port side of modem 16 and fax 18. POTS wiring 12 provides wiring infrastructure used to network multiple clients at a customer premises (e.g., home) 20. POTS wiring 12 can be conventional unshielded twisted pair (UTP) wiring that is generally routed internally in the walls of the customer premises 20 to various locations (e.g., rooms) within the customer premises. Subscriber loop 22 (also called a "local loop") is a physical wiring link that directly connects an individual customer premises 20 to the Central Office through telephone interface 24, a demarcation point between the inside and outside of customer premises 20. Of particular importance for residential networks are systems that provide communication between computers as reliably and with as high a data rate as possible. Communication over residential telephone wiring is provided through inventive frame-oriented link, media access and physical layer protocols and implementation techniques associated therewith.

Given the HPNA environment, an opportunity exists integration of the HPNA environment with voice services for transfer of voice message (from a caller) to a voice services recipient(a called party) over, for example, a cable modem system, or a Wide Area Network (WAN), or a Global Network such as the Public Switched Telephone Network (PSTN) or Internet Protocol (IP) Network. FIG. 2 depicts such an integrated environment. As can be seen in FIG. 2, a connection point in the home to the telephony world (e.g., the world of video, voice, high speed data network traffic), could be provided to a home user through cable modem 30 which would include an HPNA transceiver. The cable modem system provider may also wish to accommodate providing telephone service along with high speed data service. A home computer user, rather than using a traditional modem to connect to an internet service provider, would find it convenient to utilize cable modem 30, taking advantage of the very high speed data service provided by the cable modem. Having a cable modem customer, the cable modem provider may also find it commercially beneficial to offer video feeds, and telephone service over the same cable modem network. Cable modem 30 would be coupled to Headend 32 over Hybrid Fiber Coaxial (HFC) network 34. Headend 32 would include internet router 36 having Cable Modem Termination System (CMTS) 38 for communication with the Internet. A CM/CMTS system can be implemented using the Broadcom Corporation Model Number BCM3210Cable Modem Termination System product and is described in detail in U.S. patent application Ser. No. 09/501,850 entitled "Cable Modem System with Sample and Packet Synchronization", which is incorporated by reference herein.

Referring now to FIG. 3, there is shown a more simplified example of a voice services communications network, along with a depiction of the synchronous and asynchronous aspects associated with particular portions of the network. Telephone handset 40 is connected to terminal 42 which consists in part of: (a) voice codec 44, which converts between analog signals and. sampled digital signals at a sample rate which is determined by a clock in the codec (hereinafter "Clock 2"), and (b) HPNA network interface(I/F) 46a, which assembles the voice samples into a packet (e.g., such as a layer-2 frame type) which is then transmitted on HPNA network 48 to gateway 50. Gateway 50 receives the HPNA packet at counterpart HPNA network I/F 46b and queues it for transmission by Wide Area Network (WAN) interface 52. This transmission is made synchronous to a gateway clock (hereinafter "Clock 1") in gateway 50 which is determined by the access equipment at the other end of the DOCSIS link 56, e.g., the CMTS, should gateway 50 be part of cable modem 30 as seen in FIG. 2. Clock 1 is made synchronous in gateway 50 in accordance with the teachings of U.S. patent application Ser. No. 09/501,850 referenced above. The packet sent up WAN DOCSIS link 56 is routed across global Internet Protocol (IP) network 54 to the destination, e.g., a comparable gateway/terminal combination (or equivalent) to that of gateway 50 combined with terminal 42. Similarly, voice packets received over the DOCSIS WAN link 56 by WAN I/F 52, are transmitted by gateway HPNA I/F 46b over HPNA network 48 to terminal HPNA I/F 46a, where the packet is disassembled back into samples which are converted by voice codec 44 back into analog signals for telephone handset 40. Included in FIG. 3 is a depiction of information transition 60 from the DOCSIS domain (synchronous to Clock 1) to the asynchronous HPNA network (which introduces some jitter), and transition 62 from the asynchronous HPNA network to the terminal voice codec domain (synchronous to Clock 2).

A need therefore exists for a effective transport of synchronized voice services over a non-synchronous network. The present invention provides a solution to such need.

SUMMARY OF THE INVENTION

In accordance with the present invention a method is providing for synchronizing one or more synchronous terminals with one or more synchronous endpoints, each synchronous terminal and each synchronous endpoint having an asynchronous communications network coupled between at least one synchronous terminal and at least one synchronous endpoint. A synchronization protocol (SP) is established between a synchronous terminal and a synchronous end point by providing a gateway between the asynchronous communications network and the synchronous end point, the gateway communicating with the synchronous terminal over the asynchronous communications network in accordance with the synchronization protocol. The synchronization protocol includes sending a message (referred to herein as an "SP packet") from the gateway to the synchronous terminal, the SP packet containing a timestamp identifying a clock associated with the synchronous end point. The synchronous terminal establishes a clock associated with the synchronous terminal by creating a clock estimate based upon the timestamp message and measurements of the access jitter introduced by the asynchronous communications network such that the clock associated with the synchronous terminal enables packet sampling and transmission onto the asynchronous communications network to and from the synchronous terminal to be synchronized with the clock associated with the synchronous end point.

BRIEF DESCRIPTION OF THE DRAWINGS

FIGS. 4a and 4b depicts a comparison of clocks not at the same frequency

DETAILED DESCRIPTION

Figure 1:
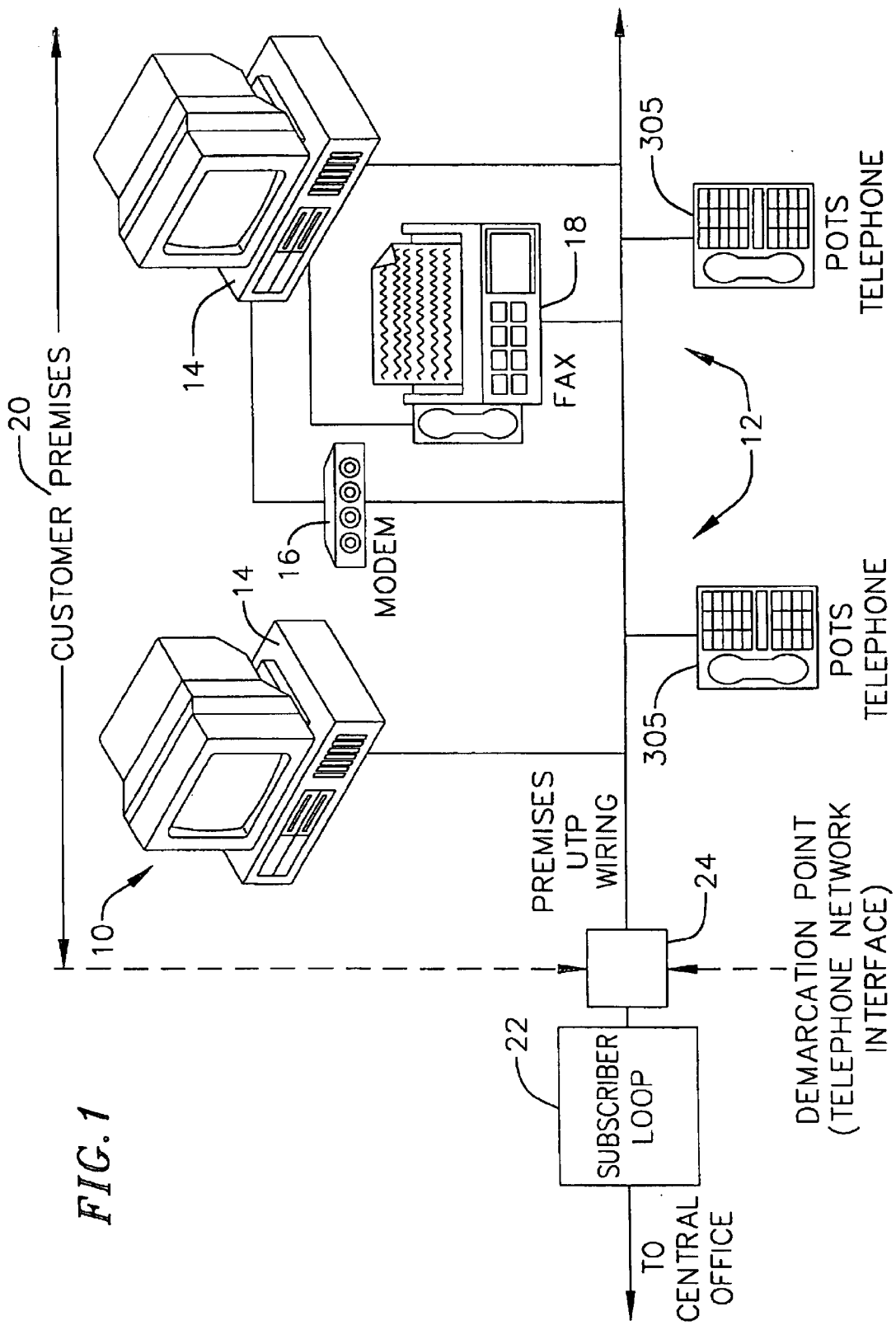
FIG. 1 shows a general home networking environment within which the present invention can be implemented.
Figure 2:
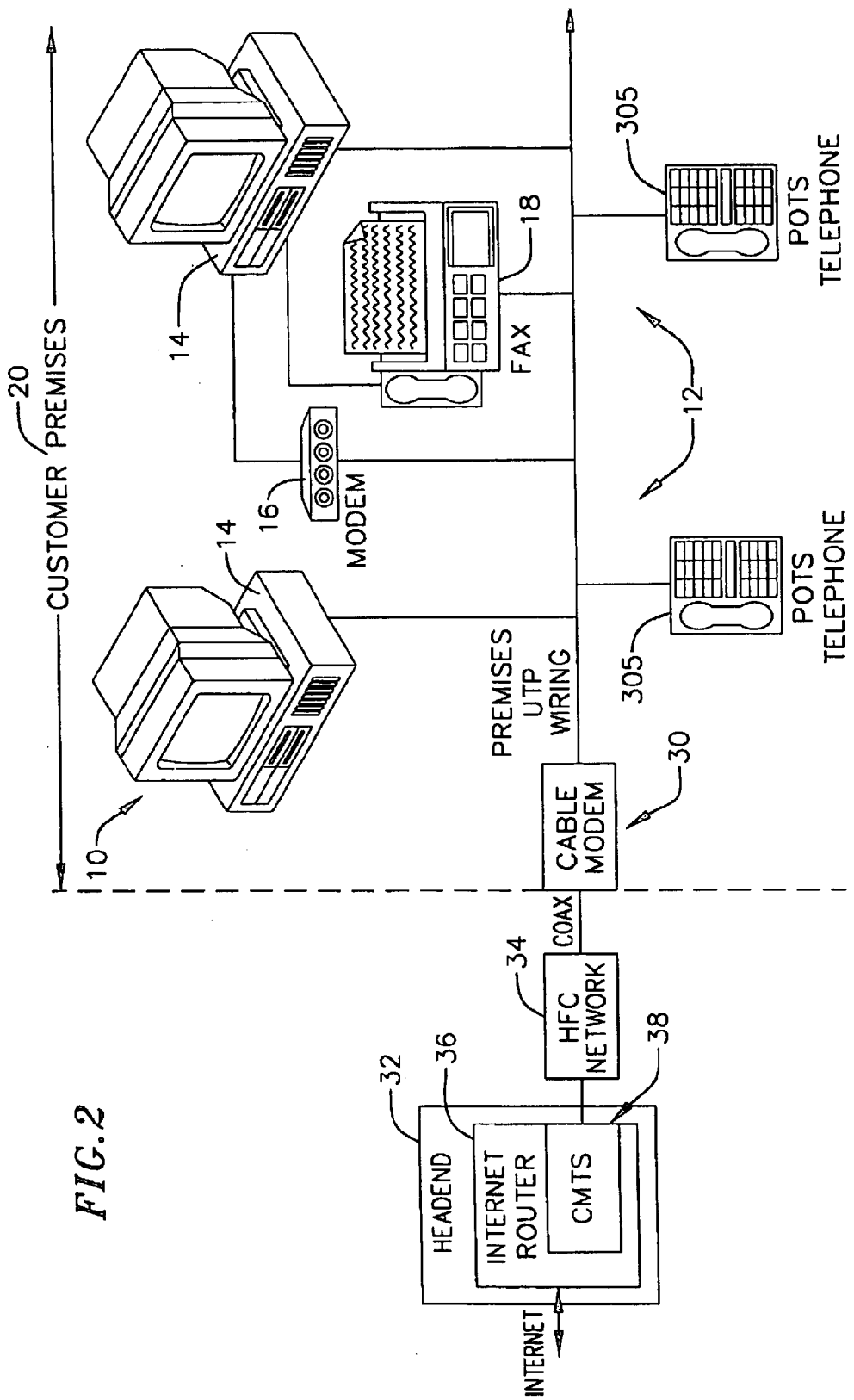
FIG. 2 shows an integration of an HPNA environment with voice services.

As mentioned above, recent interest has been directed at emulating telephony or POTS services over packet networks. In accordance with the present invention, a telephony device (hereinafter "Terminal") is attached to a packet network, such as Ethernet or HPNA. The Terminal samples the voice signal at a synchronous rate (e.g. 8 kHz samples), and collects some number of samples (e.g. 80 samples or 10 milliseconds) into a single packet. In some cases, the voice samples in the packet are compressed, using one of several well-known voice compression algorithms. (However, it should be noted that such compression is independent of the invention described herein.)

When a voice packet is assembled, the Terminal attempts to send the packet over the HPNA segment to a gateway device (hereinafter "Gateway"), e.g., a cable modem, which then forwards the packet over a wide-area link which is providing the packetized voice service. The link between the Gateway and the global network may be synchronous (e.g. providing periodic slots for packet transmission every 10 ms).

HPNA is a class of Ethernet network, where access to the network is determined by a Carrier Sense Multiple Access (CSMA) technique. With CSMA the latency introduced by network access includes an exponentially distributed delay resulting from the Collision Resolution process of the CSMA network. Further delay is created by the presence of other active stations on the network which gain access to the network prior to Terminal's packet transmission. These delays count against a limited overall network latency budget, such access delays contributing to the reduction in network voice quality.

An essential difficulty is that the worst case delays must be concatenated if there is not synchronization between the delay mechanisms. If synchronization can be achieved, then worst case delays can be aligned such that the overall delay is reduced to the single maximum delay encountered.

To better understand the latency issues, a brief description thereof is now undertaken.

FIG. 4a shows that when Clock 1 and Clock 2 are not at the same frequency then "timing slips" 70 can occur where the periodic transfer of packets from Clock 2 to Clock 1 are interrupted because either: (a) Clock 1 has drifted in phase to the point where two packets arrive in the same Clock 1 interval, or (b) no packet arrives in a Clock 1 interval (not shown). FIG. 4b shows what happens when timing jitter 72 is introduced in the transmission from Terminal to Gateway by access delays on the HPNA network. Assuming the jitter is less than a given Clock 1 interval (e.g., 10 milliseconds), then certain phase offsets between Clock 1 and Clock 2 are safe as depicted at timing 74 in FIG. 4b, providing enough margin such that a given packet from the Terminal arrives in time for the upstream DOCSIS transmission determined by Clock 1. Note that in systems there may be more than one Terminal attached to an HPNA network. In this case, packets from each of the Terminals arrive at the Gateway for upstream transmission, and packets coming downstream to the Gateway are distributed to the appropriate Terminal by the HPNA network addressing mechanism. Note also that although the description is in terms of DOCSIS and HPNA, any wide area access link and any local area network are covered by this application.

The source of possible HPNA jitter is now discussed. The HPNA network introduces a variable amount of delay between the time an I/F has a packet ready to transmit (at T0), and the time when that packet actually commences transmission on the wire. This delay can be contributed by several factors: (a) the delay from T0 to when the currently active station (if any) finishes its transmission—this can amount to over 3 milliseconds on an HPNA network (hereinafter referred to as "Basic Access Delay"); (b) additional delay introduced by stations transmitting at a higher priority (PRI), which are always granted access before stations of lower priority, but since it assumed that packetized voice traffic uses the highest priority, this delay, in effect, does not exist; (c) delay needed to resolve collisions with other stations attempting to transmit on this high priority, e.g. other packetized voice stations (hereinafter referred to as "CRA Delay"), and (d) delay caused by those other stations winning the collision resolution and therefore transmitting before this station (hereinafter referred to as "Priority Access Delay").

Figure 5:
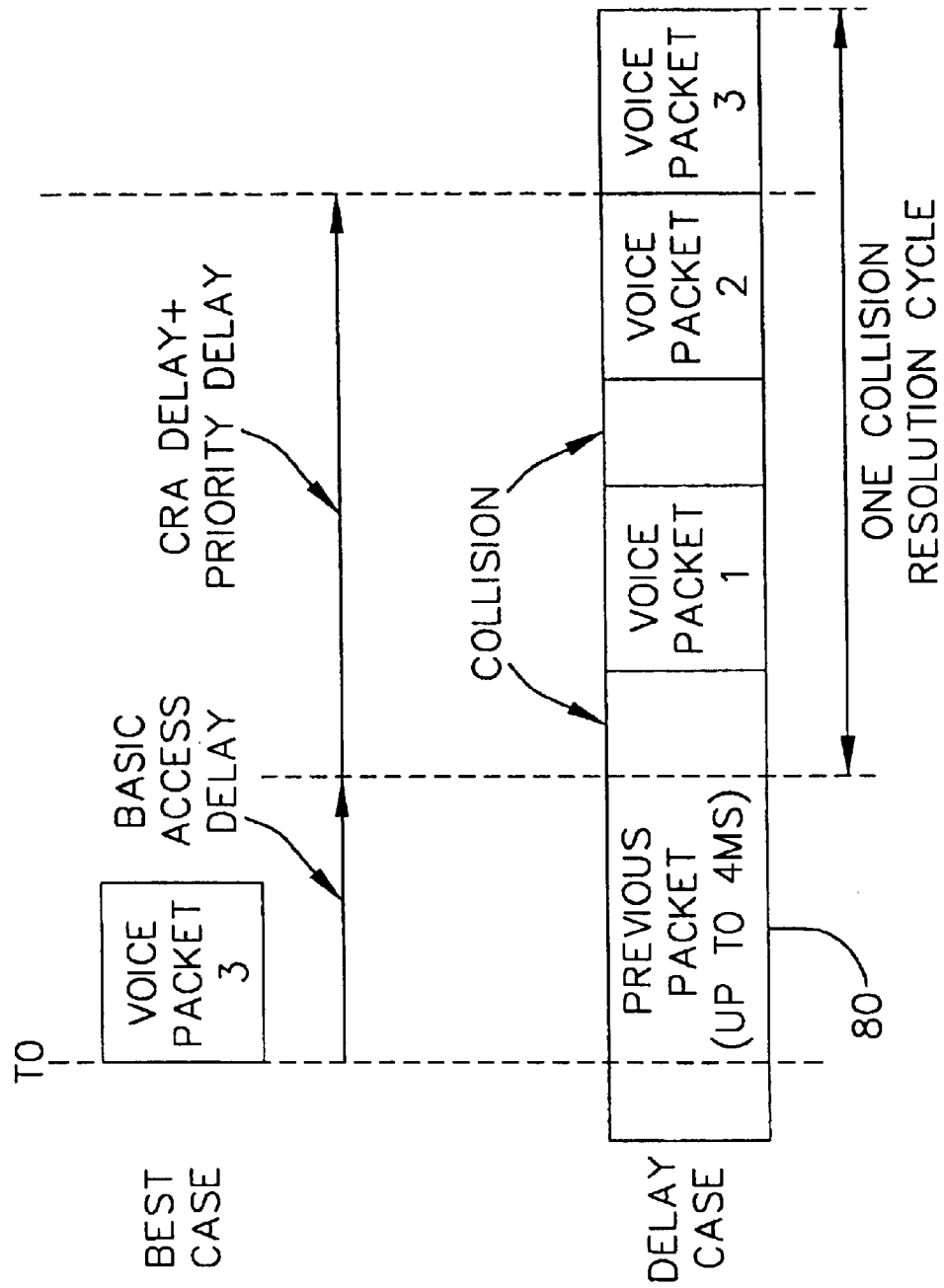
FIG. 5 shows a comparison of Best Case and Delay Case for HPNA jitter.

FIG. 5 shows an example depicting a Best Case scenario and a Delay Case scenario. In the Best Case scenario Voice Packet 3 (for example, where there are three packetized voice stations sending packets) is transmitted at T0. In the Delay Case scenario there are potential delays caused by previous packet transmission 80, two collision resolution cycles to determine access ordering among, for example, three packetized voice stations sending Voice Packet 1, Voice Packet 2 and Voice Packet 3, and Priority Access Delay for transmissions from packetized voice stations sending Voice Packet 1 and Voice Packet 2.

Figure 6:
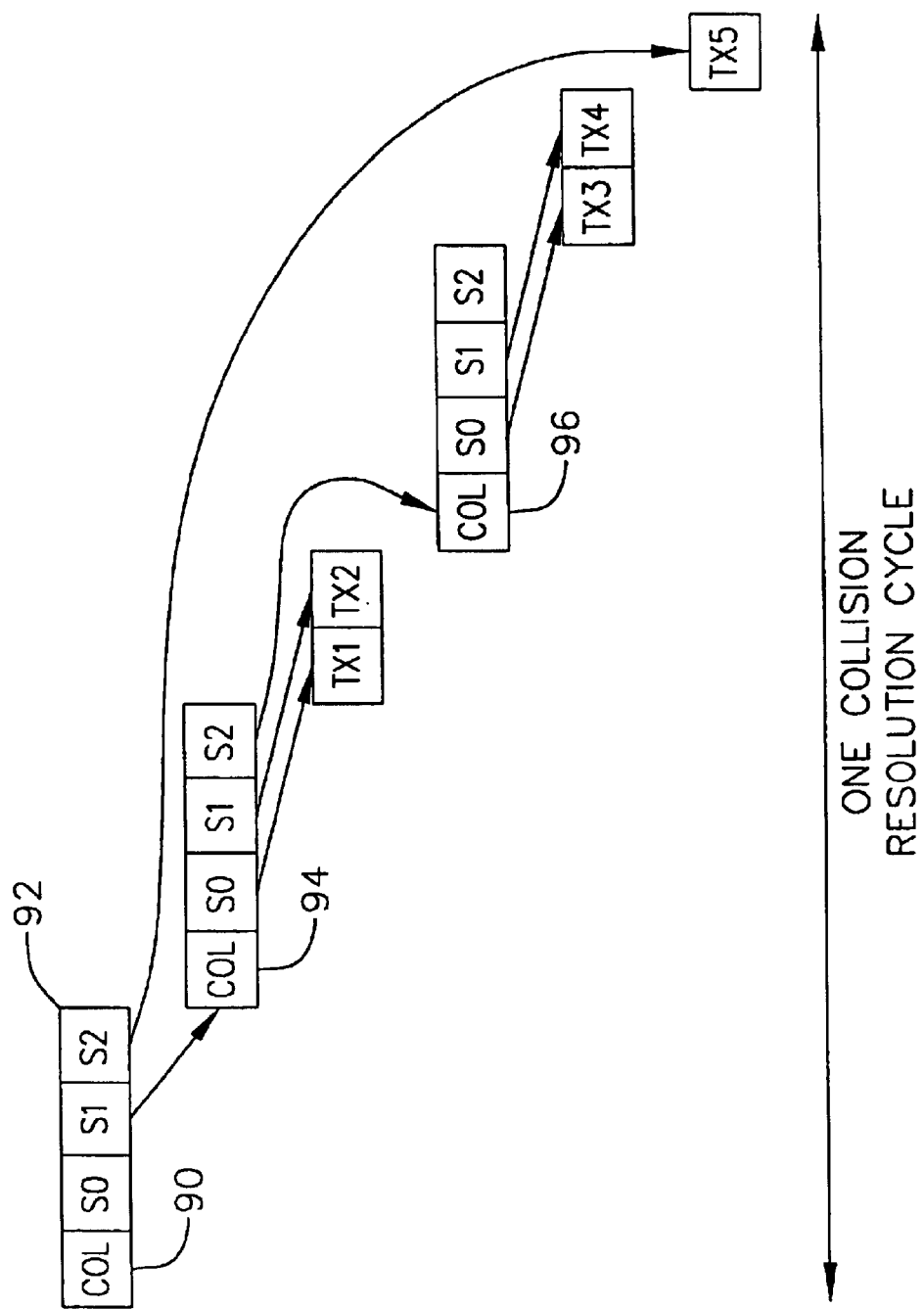
FIG. 6 shows an example of how collision resolution results in access delay in HPNA networks.
Figure 7:
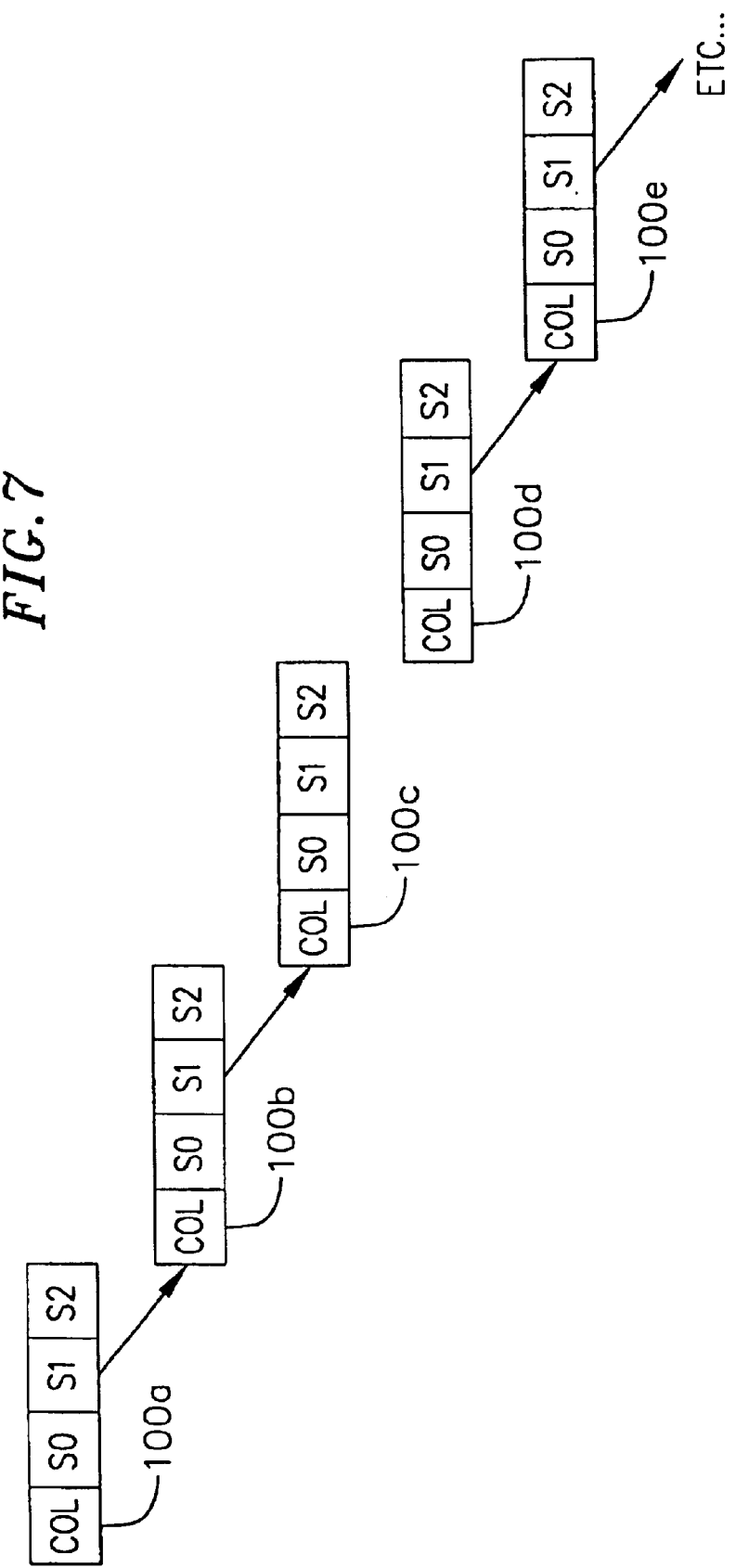
FIG. 7 depicts how the number of collisions needed to resolve ordering among two stations is not bounded.
Figure 8:
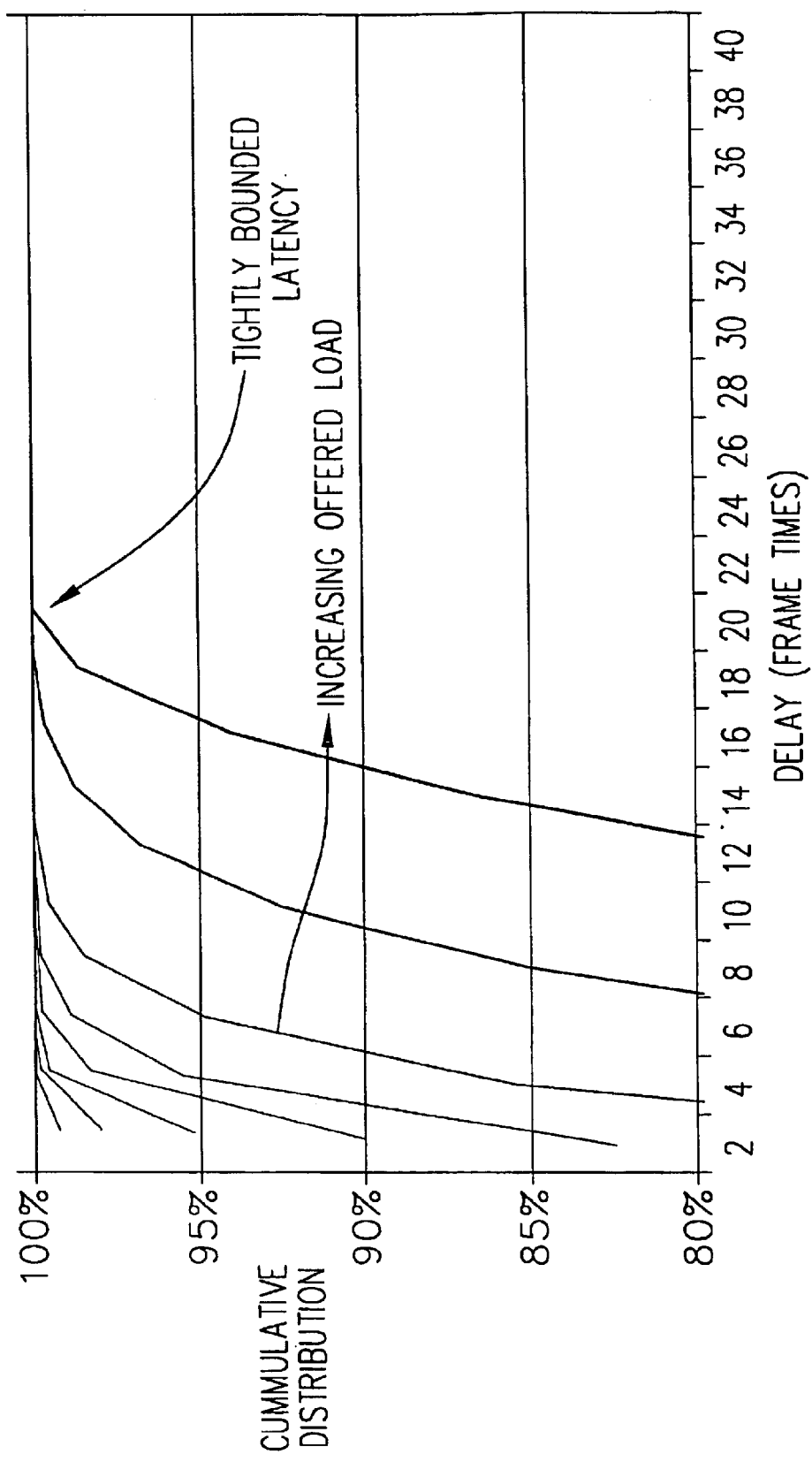
FIG. 8 shows in graphical form cumulative distribution percentages as a function of delay for tightly bounded latency.
Figure 9:
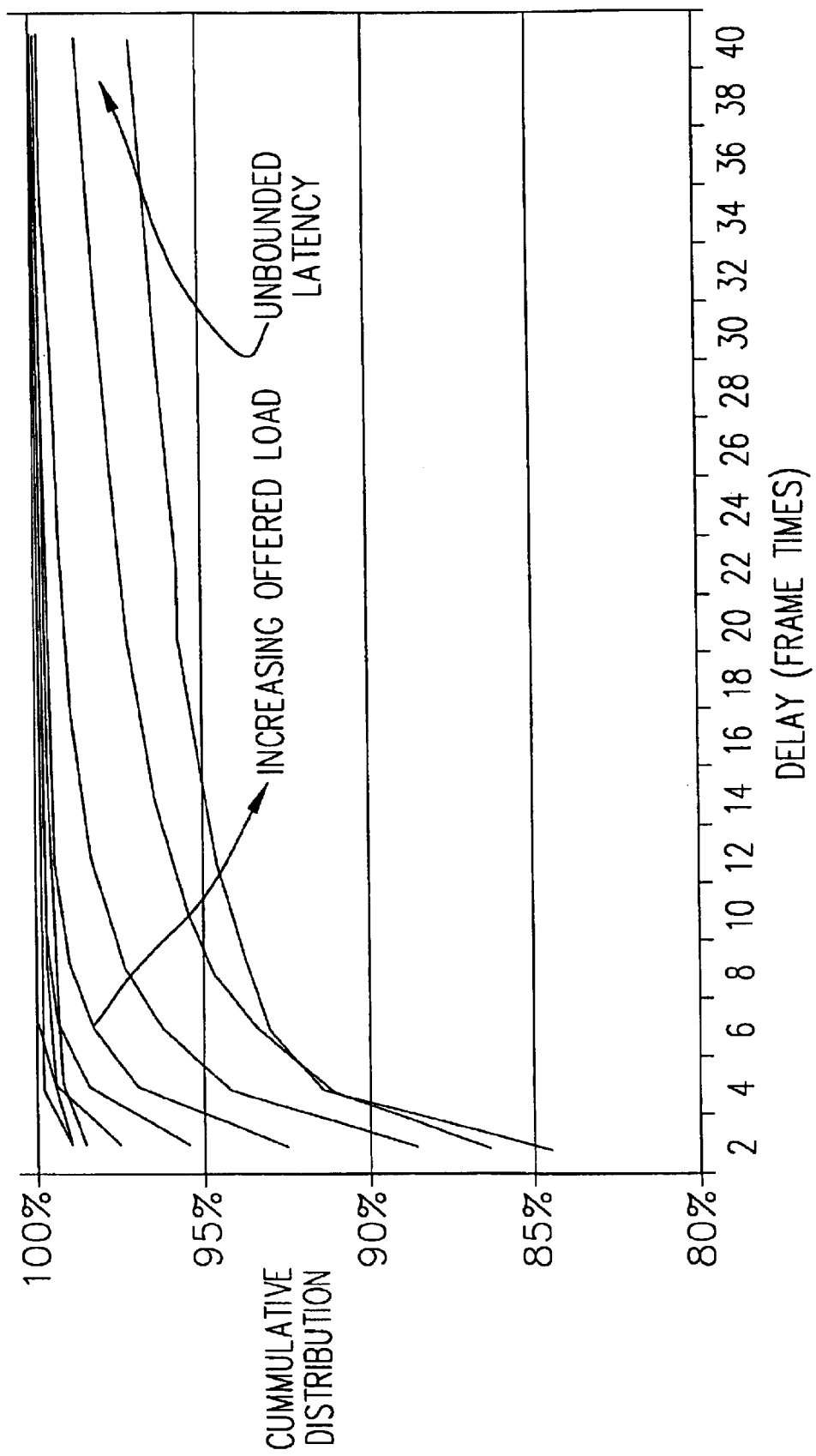
FIG. 9 shows in graphical form cumulative distribution percentages as a function of delay for unbounded latency situations.

FIG. 6 shows an example of how collision resolution results in access delay in HPNA networks. (The media access method of HPNA is described in detail in commonly assigned pending U.S. patent application Ser. No. 09/026,884 entitled "Packet-Switched Multiple-Access Network System with Distributed Fair Priority Queuing".) In multiple access networks with shared medium using carrier sense multiple access with collision detection (CSMA/CD) when more than one station attempts to transmit at the same time a collision 90 is detected. In the HPNA DFPQ method, when stations detect a collision they cease transmission and each station chooses a position in a 3-way ordering, and indicates its choice by sending a Signal (shown as S0, S1, S2 in FIG. 6). Then all stations that see the presence of a signal with a lower number than the one corresponding to the ordering choice they have made will defer, allowing those stations with the first ordering choice to proceed (indicated by S1 in group 92). Then, proceeding with the example, a second collision 94 occurs among stations 1, 2, 3 and 4. Station 1 chose S0 and therefore is free to transmit first (TX1). Station 2 chose S1 and therefore transmits next. Stations 3 and 4 chose S2 so their transmission attempts results in another collision 96. This time they choose different orderings (S0 and S2) and transmit without further collisions. Finally, station 5, which had chosen S2 in the first collision, is given the chance to transmit. In the example shown, five transmissions are resolved using three collisions. However, the number of collisions needed to resolve the ordering among two or more stations is not bounded, see FIG. 7. In this example, each time a collision 100a–100e, etc. occurs two or more stations chose S1 and therefore collide again. Using the DFPQ algorithm, the distribution in access delay is an exponential function which is tightly bounded when compared with another popular collision resolution algorithm, Binary Exponential Backoff used by typical standard Ethernet networks. However, even the tightly bounded performance of DFPQ can result in delays exceeding the maximum allowable delay for packetized voice, resulting in timing slips and audible artifacts. FIGS. 8 and 9 show Cumulative Distribution percentage as a function of Delay under increasing offered load for both tightly bounded latency and unbounded latency situations.

In FIG. 8 the statistics are shown for a large number of transmissions attempts by a station on an HPNA network using DFPQ collision resolution. The horizontal axis indicates a time (or latency) taken to resolve collisions and gain access to the channel. The vertical axis indicates the percentage of transmission attempts that involve delay less than or equal to the corresponding position on the horizontal axis. This is commonly referred to as a cumulative distribution.

There are several curves shown in FIG. 8, each corresponding to an increasing amount of offered load on the network, up to 100% of achievable throughput. Naturally, the higher offered loads correspond to those curves that reach a given level of cumulative distribution further to the right (increased delay) on the diagram. For instance, the rightmost curve of FIG. 8 indicates that 90% of transmission attempts see a delay of less than 16 Frame Times (where Frame Time is an arbitrary measurement of delay referred to the time taken to transmit a nominal packet of 512 bytes).

What is significant in the comparison of FIG. 8 versus FIG. 9 is that the important characteristic is the bound on latency that is only exceeded a small fraction of the time, i.e., the point where the curve approaches the 100% limit within all but for a negligible number of events. This point occurs at a much larger delay for FIG. 9 (Ethernet BEB) than FIG. 8 (HPNA DFPQ). For example, the system requirement for acceptable voice transmission may state that the delay bound can only be exceeded in one out of a million events.

The delay statistics of HPNA are relatively good, and collision resolution delays of 10 ms are exceeded in less than on in a million events. However, since overall latency better than 10 ms is desirable, further aspects of the invention reduce or eliminate collision resolution delay.

In accordance with one aspect of the present invention, a solution is to synchronize the phone codec with the Gateway synchronous transport (DOCSIS 10 ms or ADSL cell slot time) by means of a Link Layer protocol, i.e., Synchronization Protocol (SP) between the Gateway and the codec. In this way, the codec creates a packetized sample (nominally every 10 ms) synchronous with, and advanced by a fixed window, from the upstream slot of the Gateway. The amount of advanced window is just enough for the maximum jitter on the HPNA network (4+ms), so that in the worst case the codec sample arrives at the Gateway just in time. (The parallel construct deals with downstream voice).

Packetized voice traffic is transmitted over HPNA using a priority mechanism (a 3-bit priority number associated with each station's transmission) which allows packetized voice traffic to gain access in preference to lower priority traffic such as data traffic, or non-real-time streaming media traffic. In the operation of this mechanism using Priority (PRI) 7 for packetized voice, the only latency seen by voice traffic is then the delay (Basic Access Delay) as a result of a previous (possibly lower priority) transmission finishing on the wire (e.g. a maximum of 4 ms), plus the delay caused by other packetized voice transmissions.

The jitter on the HPNA network is minimized if all the PRI=7sources are synchronized in attempting to access the wire. When one of them attempts to transmit and if there are multiple transmitters (guaranteed with full-duplex flow with even one terminal), then there is a collision resolution cycle. This cycle resolves in exponential time, but with a maximum delay (CRA Delay) at some low drop rate ($10^{-6}$ packets). After collision resolution has been accomplished, then all packetized voice stations transmit in resolved order, so that the latest transmission occurs at some multiple of the packetized voice packet transmission length (e.g. 2 ms for 4 stations), that is, there is an additional Priority Access Delay.

Note that four downstream transmissions from the Gateway do not incur a CRA Delay, since they are sent from a privileged station which controls the synchronization and order of access by the upstream stations, and thus do not need to be resolved by the collision mechanism.

The Gateway has a buffer that holds the PRI=7 packets on arrival, waiting for the window to transmit upstream. Assuming that the upstream transmission is done on a synchronous basis (e.g. DOCSIS), then the terminal synchronization can time packet arrival so that the latest the packet arrives is just prior to the upstream transmission window.

Note that the latency described herein is the delay measured from the last voice sample in a packet, but the first sample of the packet is always further delayed by the time taken to assemble the multiple samples into a packet for transmission, called the "packetization delay". Typically voice is sampled at an 8 kiloHertz rate and 80 samples are assembled into a packet, resulting in a packetization delay of 10 ms.

Furthermore, additional parts of the invention can reduce the CRA Delay, Priority Access Delay and Basic Access Delay.

The SP can be extended to specify the detailed ordering between Terminals. Each Terminal observes transmissions on the wire, and initiates its transmission after it has seen the transmission from the Terminal which immediately precedes it in the broadcast ordering. In this way there are no collisions between Terminal transmissions and no CRA Delay. Also, the Priority Access Delay is now known to each station, and that delay time can be used to overlap other delay processes such as voice compression.

Finally, with modification to the HPNA MAC for all stations, non-packetized voice terminals, e.g., network clients 14 shown in FIG. 1, can observe the same SP and establish a "keep out window" (KOW), such that their lower priority transmissions are deferred if the station notices that transmitting would result in the transmission overlapping the high priority packetized voice traffic. This can eliminate the Basic Access Delay, but at the cost of restricting the bandwidth available to lower priority stations.

The observance of the KOW can be made sensitive to the network loading, so that the bandwidth lost to the keep-out interval does not impact total network throughput. For example, when network loading is light the KOW is observed, but when the network offered load is at a maximum for some averaging time, the KOW could be sacrificed for highest throughput. This might be acceptable, as the latency improvement would be achieved in most cases. Without this mechanism the Basic Access Delay would be seen even when the network loading was modest.

An alternative method for ordering is to use the standard collision resolution mechanism once to determine an order, but then, on subsequent access to the network each terminal remembers the ordering that resulted and sequences its transmissions with other stations to replicate that ordering, without further collisions or collision resolution cycles.

Figure 16:
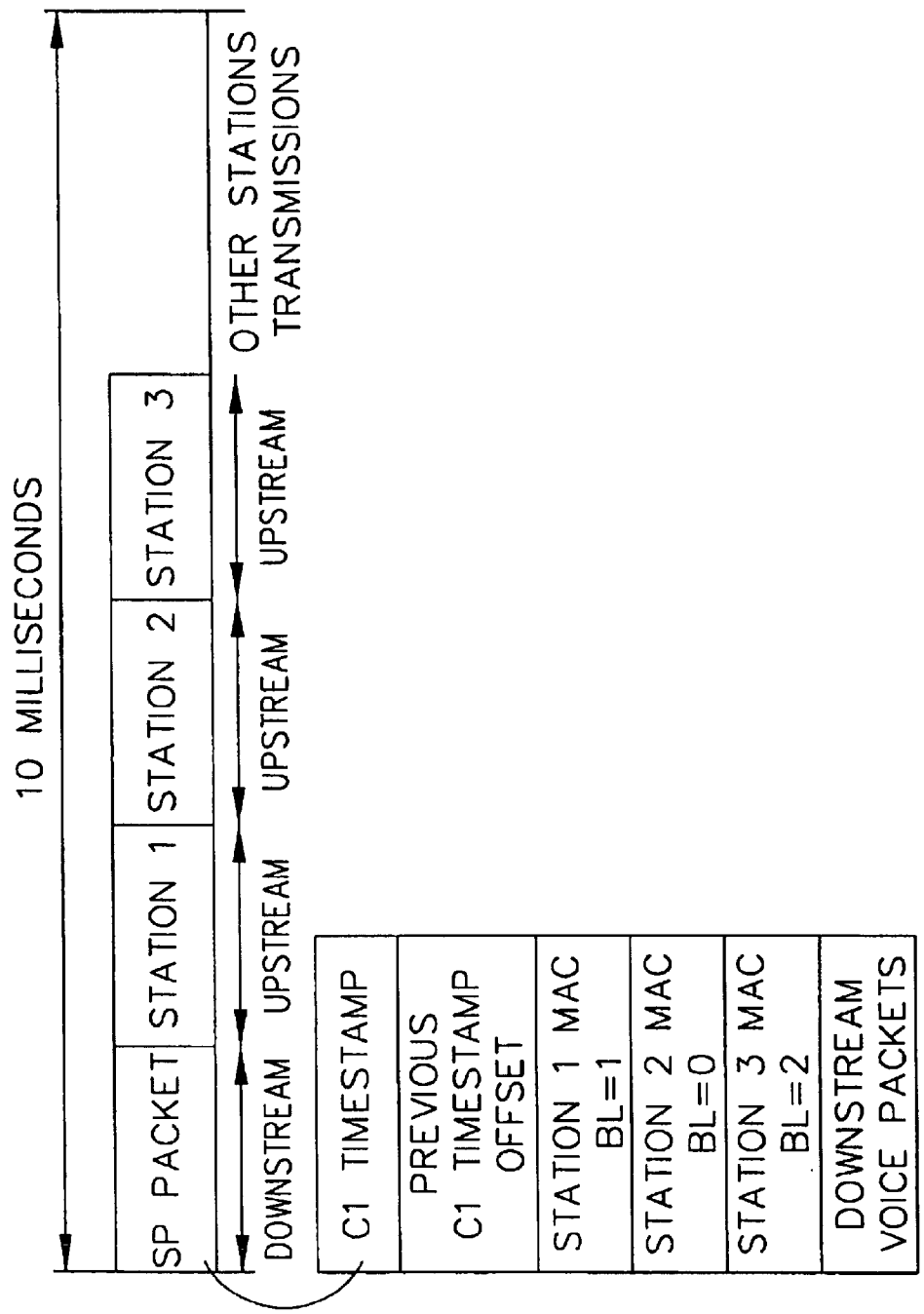
FIG. 16 shows the transmission ordering of packetized voice stations when using the preloaded BL method.

If packetized voice stations are synchronized and phase adjusted so that the upstream transmissions happen at the same time in one 10 ms period, then the SP could also tell each station what Backoff Level (BL) with which to initialize the MAC state machine. BL's would be allocated to stations, starting at 0. This would have the effect of preloading the relevant MAC machines with a state that behaves as if collision resolution had already happened, since all the collision resolution algorithm does is to sort out the contending stations so that they have unique BL's. Then each station would transmit in sequence without any possibility of collision, as governed by the DFPQ MAC function. By means of example, referring to FIG. 16, if three packetized voice stations are active, the Gateway would signal in the SP packet that Station 1 (identified by its 48-bit MAC address) should preload its BL with 1, that Station 2 should preload with 0, and that Station 3 should preload with 2. Then following the SP packet all upstream Stations will have a voice packet ready to transmit, but only Station 2 will be allowed by the MAC function (since it has BL=0). Following Station 2's transmission, the BL in all ready-to-transmit stations is decreased by one. This allows Station 1 to transmit, and likewise Station 3 can then transmit.

This would have two advantageous effects: collisions would be eliminated (at least among the synchronized station's traffic), and the order of transmission would be deterministic, allowing finer phase tuning to match the upstream slot ordering on the DOCSIS link. The net result would be that the packetized voice stations with the lowest pre-loaded BL would obtain access, and then each of the other packetized voice stations would access the wire in order, without contention and without collision.

Figure 17:
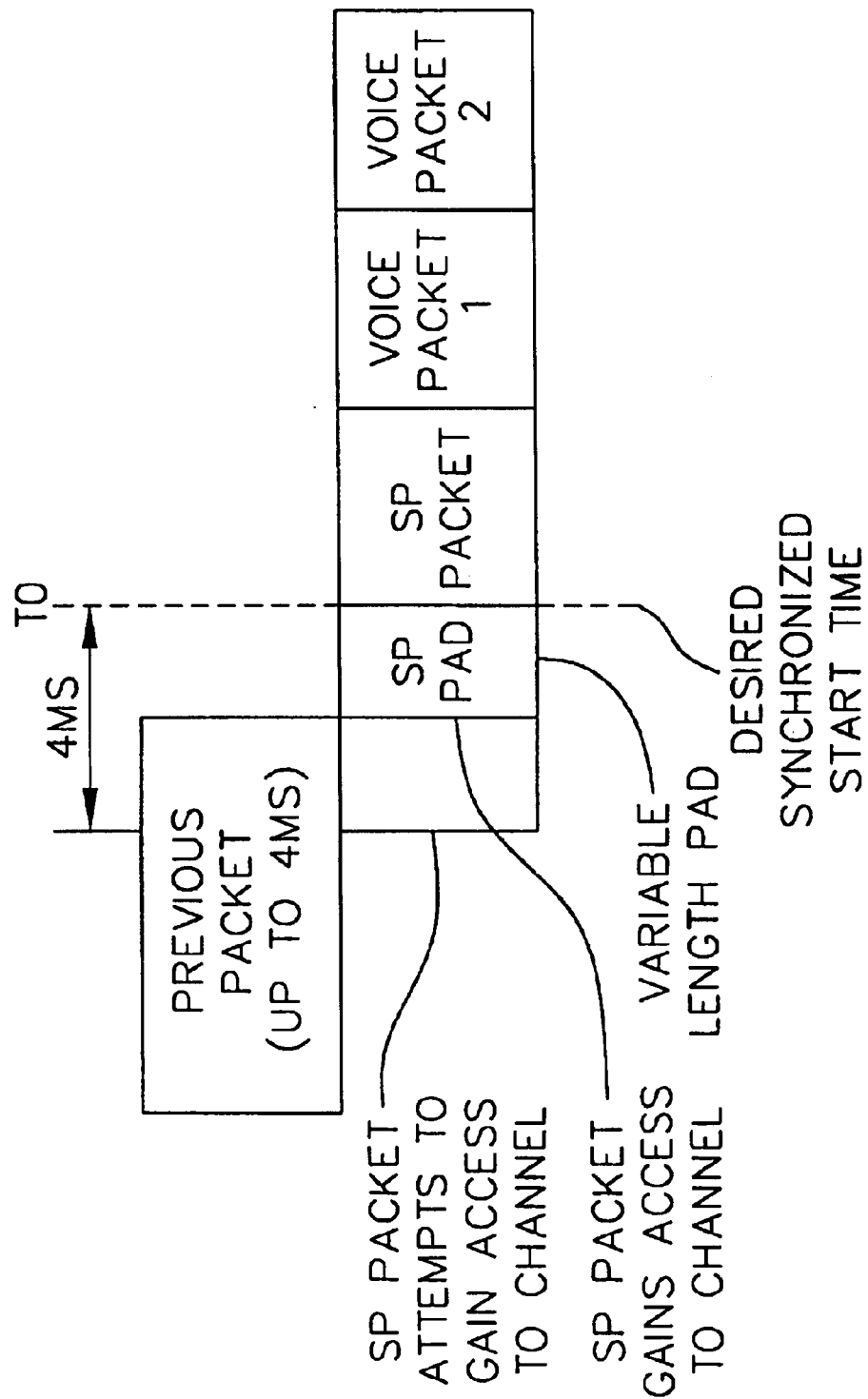
FIG. 17 shows the use of padding in an SP packet to eliminate the Basic Access Delay.

As mentioned above, the Basic Access Delay (up to 4 ms) can be eliminated by a MAC keep-out (KOW) which is respected by all the lower priority stations. Referring to FIG. 17, an alternative technique where there are HPNA stations that do not know about KOW is for the first-ordered packetized voice station to start it's CSMA access 4 ms ahead of the nominal synchronization time, and when it actually gains access to the wire (anywhere from 4 to 0 ms before synchronization time), it transmits a frame which is just long enough to extend to the synchronization time. The frame commences with null data or padding to fill out the frame (a PAD) to reach the synchronization time, and then has the voice sample packet at the very end and the rest of the frame. This way, the active packetized voice stations ensure there is no Basic Access Delay, since the end of the first voice packet occurs at a predictable time. The cost is that no lower-priority station can commence transmission during 40% of the 10 ms periods on the wire, potentially reducing maximum data throughput by some amount, perhaps 20% on the average depending on frame sizes. Similar loss of performance occurs with either a cooperative keep-out mechanism, or a busy-keep-out method, although the cooperative method does allow traffic in the 4 ms prior to synchronization that is guaranteed to finish before synchronization. Perhaps this reduces the average throughput loss to less than 20%.

It should be noted that a busy-keep-out mechanism can be selectively used by packetized voice stations depending on some policy decisions. For instance, it might be acceptable to have absolute best latency when the HPNA network isn't very busy, but then degrade softly to a little more jitter and voice quality impact if the offered load is high. Or, this could be a mode that is dependent on configuration parameters that can be controlled by the packetized voice service provider.

The keep-out time could be adjusted to less than 4 ms if it was known that the maximum transmission time for lower-priority frames was limited, either because high bits-per-baud rates were used, or if the Maximum Transmission Unity (MTU) was limited (e.g., to 576 bytes). In this case the loss of maximum aggregate network rate could be reduced.

Also, the packetized voice station could adaptively discover the MTU size being used by flows active on the network, and reduce the keep-out time to just what is needed for the actual frame sized, to allow maximum efficiency. If some new stations start transmitting longer frames, the packetized voice stations could react by increasing the keep-out time as necessary. There might not even be a slip in many cases, as the packetized voice station can observe the traffic preceding the KOW, and notice the presence of longer frames requiring longer keep-out. The algorithm could devolve to tracking the peak frame length seen on the wire, and using a keep-out period just a litter longer.

If some jitter is acceptable, then the keep-out delay only has to be as long as the maximum frame size (either maximum possible or peak seen recently) less the jitter amount.

Tuning of these parameters could result in an acceptable balance between throughput loss and jitter gain.

Therefore, in accordance with the present invention, packetized voice codecs can be synchronized to the upstream synchronous segment of the network such that the phase of the codec packetization can be controlled allowing the sample packet to be ready just before the DOCSIS upstream grant. The HPNA MAC can be arranged so that the packetized voice stations get access to the wire at a deterministic time, and as a result the delay from codec to DOCSIS upstream can be constrained to less than 1 ms.

Figure 3:
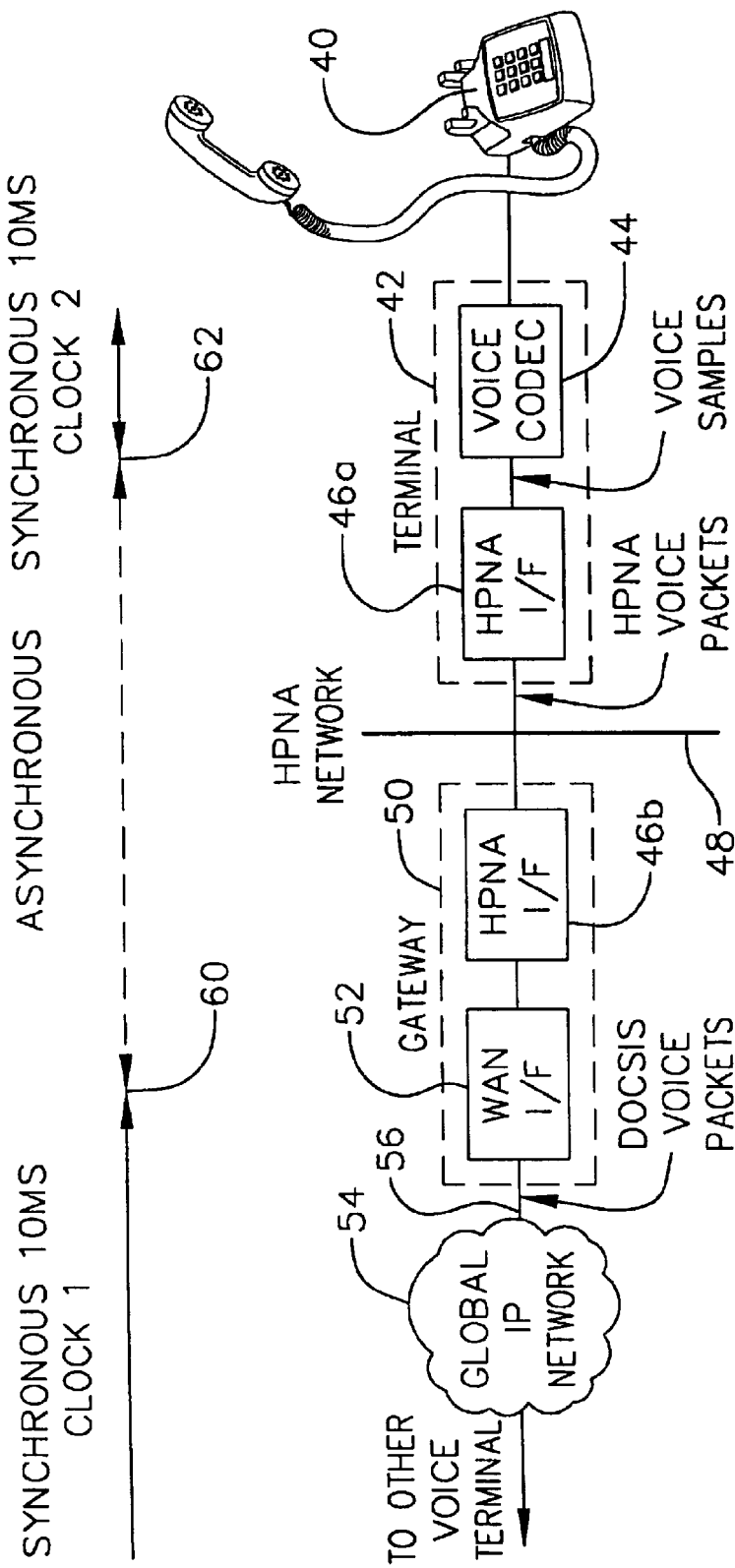
FIG. 3 shows a more simplified example of a voice services communications network.
Figure 10:
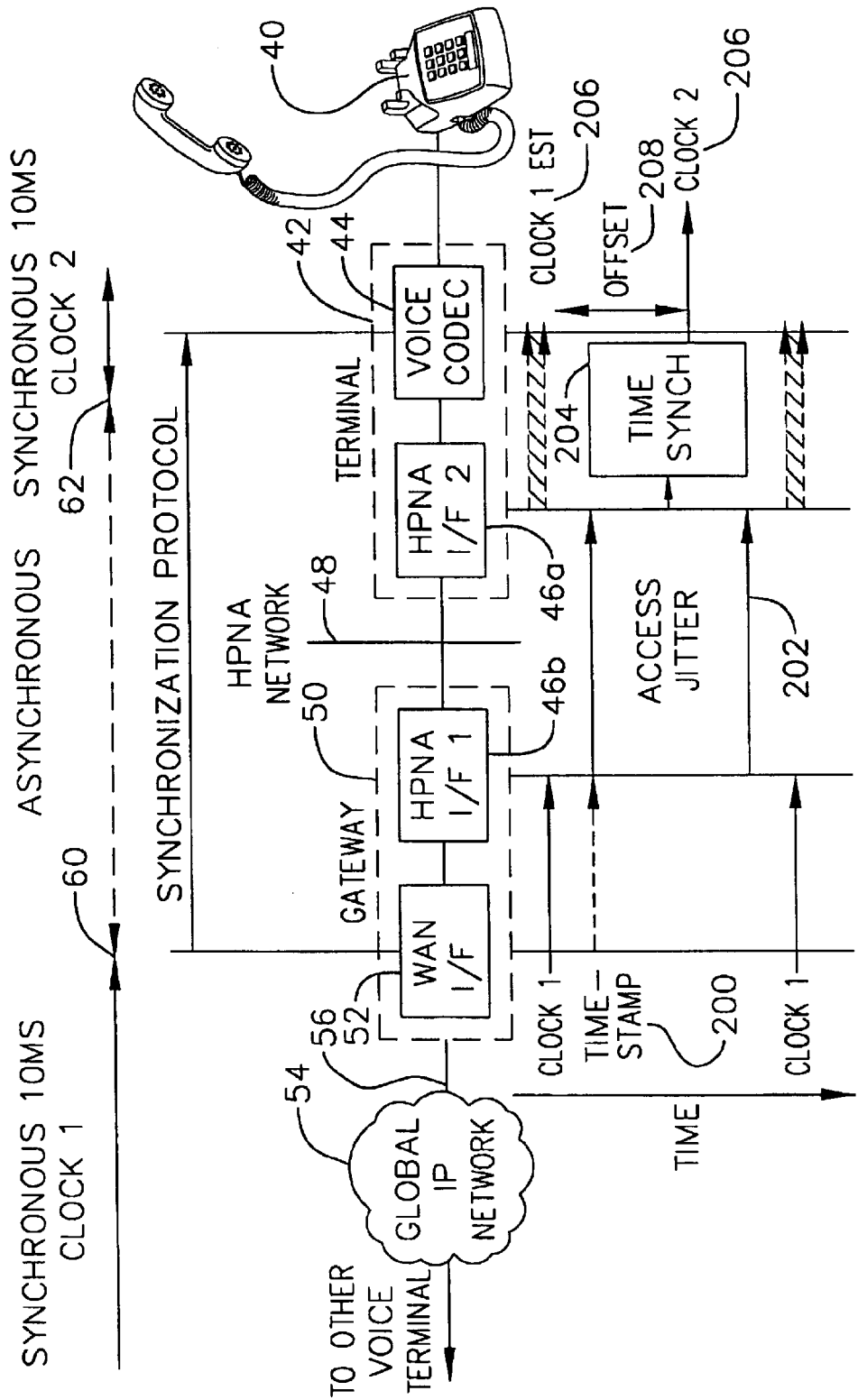
FIG. 10 depicts the operation of synchronization protocol in accordance with the present invention.

Turning now to FIG. 10, there is now shown an illustration of the operation of the SP over the network previously described above in conjunction with FIG. 3. A time/space flow diagram is shown overlapping the network components shown in FIG. 3. Clock 1 is derived from the DOCSIS access link, assumed here to occur with a nominal period of 10 milliseconds. This clock is recovered in the DOCSIS WAN I/F in the Gateway. This clock is used to initiate an SP packet transmission on HPNA network 48 (broadcast to all the Terminals). This packet contains timestamp 200 derived from Clock 1. This packet is delayed by a variable amount of time, determined by the access mechanism of the HPNA network, resulting in "access jitter" 202 in the timing of when the packet is sent from HPNA I/F 1 46b and arrives at HPNA I/F 2 46a. (It is assumed that the transmission delay once I/F 1 has obtained access to the network is nominal and can be compensated for in the algorithm.) HPNA I/F 2 46a in Terminal 42 measures the time of arrival of the SP packet, and passes that time and the packet to Time Synchronization module 204, which computes estimate 206 of when Clock 1 should next occur. This time is used to control Clock 2, with offset 208 introduced as necessary to achieve sufficient margin in system operation.

There are two methods for a Time Synchronization algorithm in accordance with the present invention. In accordance with a first embodiment of the present invention, timestamp 200 is introduced in the SP packet at the time the packet is sent on HPNA network 48, after access to the network has been achieved. Thus, timestamp 200 reflects accurately the phase of Clock 1 and can be used to control Clock 2. In accordance with a second embodiment of the present invention, timestamp 200 is introduced in the SP packet when the packet is queued for transmission by HPNA I/F 1 46b, which measures the access delay error encountered by that packet. This error information is sent in a subsequent SP packet such that Time Synchronization module 204 can compensate for the timing error. In either case, the estimated phase of Clock 1, determined by either method, is a series of samples which can be filtered to reduce the noise in the phase estimate. The filter is determined by standard sampled system theory based on the characteristics of the timing channel. For instance, a simple low pass filter will reduce the short-term jitter of the resulting estimate.

Figure 11:
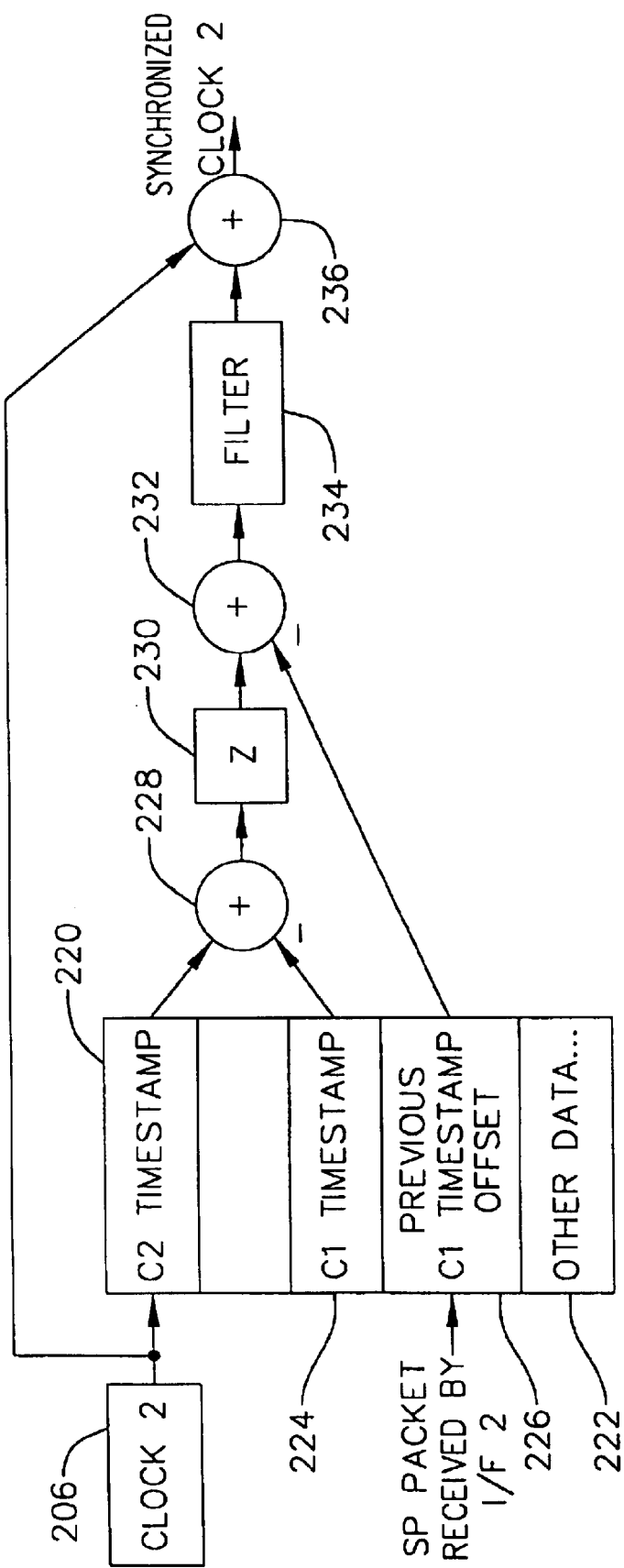
FIG. 11 shows an embodiment of the synchronization protocol in accordance with the present invention.

FIG. 11 illustrates the method of the second embodiment which includes a mechanism in a Terminal device, which adjusts the phase of Clock 2 206 to a known position relative to Clock 1, which is source from the Gateway. Not shown in this figure is a control loop which adjusts the frequency of Clock 2 to correspond to Clock 1, but this can be accomplished by several well-known methods. Clock 2 is represented by a 32-bit counter which increments at a rate sufficient to obtain desired phase resolution. At the time of arrival of the SP packet from the Gateway, the value of the Clock 2 counter is sampled and stored 220 in a data record 222 along with synchronization information from the SP packet. This synchronization information includes C1 timestamp 222 along with offset error 226 measured by the Gateway on the transmission of the previous SP packet. The difference between the sampled Clock 2 and Clock 1 timestamps is calculated 228 and stored in register Z 230. The previous SP offset is subtracted 232 from the value stored in register Z 230 from the previous packet. This produces an instantaneous measurement of phase error between Clock 1 and Clock 2. This value is then filtered 234 (for example, average over several intervals) and is added 236 to Clock 2 to produce a phase corrected Clock 2.

Figure 12:
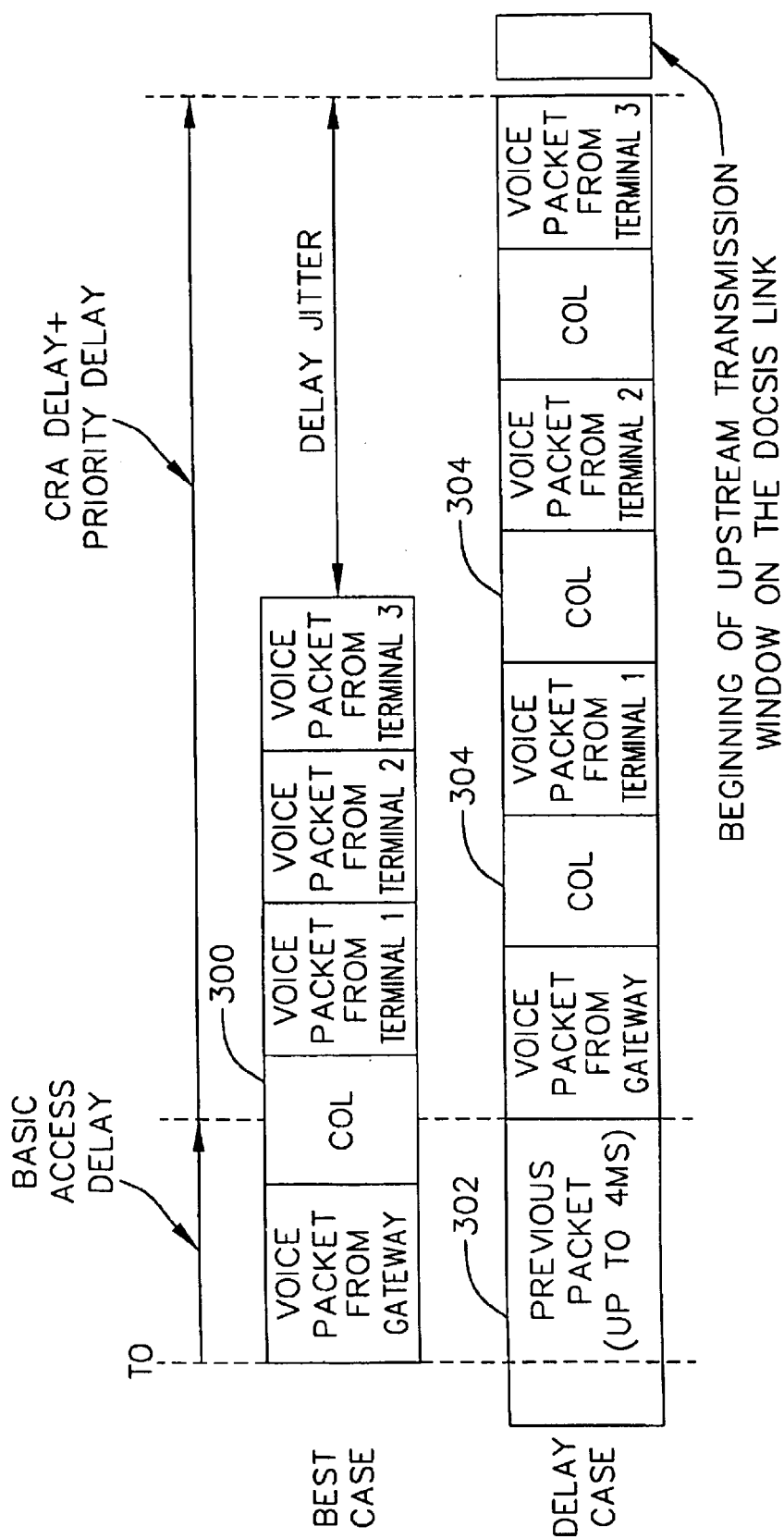
FIG. 12 shows a Best Case and Delay Case comparison in accordance with an aspect of the present invention.

Referring now to FIG. 12, another aspect of the present invention is described. In the operation of DFPQ, all stations that are ready to commence transmission at the time of the first collision participate in the collision resolution cycle—other stations arriving later defer until ALL contending stations resolve and transmit. Therefore, in accordance with the present invention delay caused by collision resolution (CRA Delay) is minimized by ensuring that all packetized voice stations attempt to transmit at the same time so that they will contend in only one collision resolution cycle. As can be seen in FIG. 12, the Clock synchronization of the Terminals is adjusted such that all Terminals become ready to transmit their packet (upstream) at T0, which is just after transmission commences from the Gateway (downstream) to the Terminals. (Recall that voice transmission is a full-duplex communication.) In fact, all the voice information for all the Terminals is contained in one broadcast packet from the Gateway. Following the Gateway transmission it is guaranteed that all Terminals will attempt to transmit and therefore contend in one collision resolution cycle. The Gateway transmission does not encounter a CRA Delay since there is only one Gateway and the terminals are guaranteed to attempt transmission after the Gateway by the clock synchronization. Another method that can be used is for each Terminal to wait until it detects the Gateway transmission before becoming ready to contend for medium access. In the example of FIG. 12, the best case delay is when there is no prior transmission and the collision between the three stations is resolved with one collision 300. The general case of delay assumes prior transmission active 302 (delaying the Gateway and therefore the Terminals), and an exponent ally distributed number of collisions to resolve the ordering among the three stations. Also in FIG. 12 it should be noted that the Gateway transmission start can be offset from the DOCSIS upstream transmission window so that the Terminal transmissions will be received before the DOCSIS upstream transmission window commences.

Figure 13:
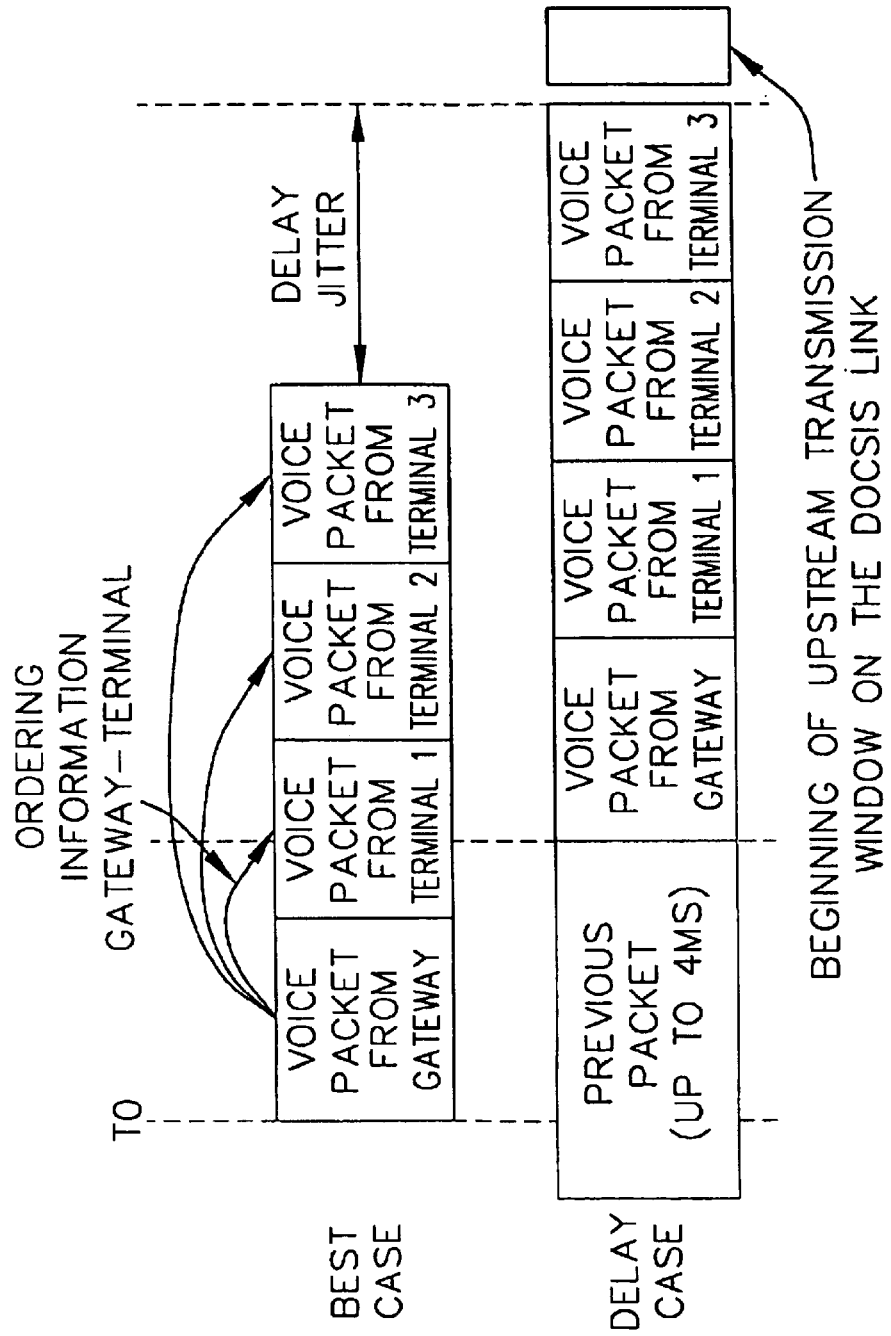
FIG. 13 shows a Best Case and Delay Case comparison in accordance with another aspect of the present invention.

Referring now to FIG. 13, there is shown methods for eliminating the CRA Delay. The methods involve ordering information sent from the Gateway to each Terminal, specifying the order among the terminals. This ordering substitutes for the ordering that would otherwise be established using collisions. In a first method, the Terminals are told their position in the transmission ordering, and the Terminal waits until it has seen the prior ordered transmissions complete before attempting transmission. A variant of this method has each Terminal watch for the MAC address of the Terminal preceding it in transmission order. In a second method, the Terminals are told what "BACKOFF LEVEL" they should initially use for MAC access, which is a parameter normally derived during a collision resolution cycle using the DFPQ algorithm. The Gateway essentially pre-computes the result of collision resolution, and communicates that to the terminals. Then the Terminals access the medium without collisions, avoiding the CRA Delay.

Figure 14:
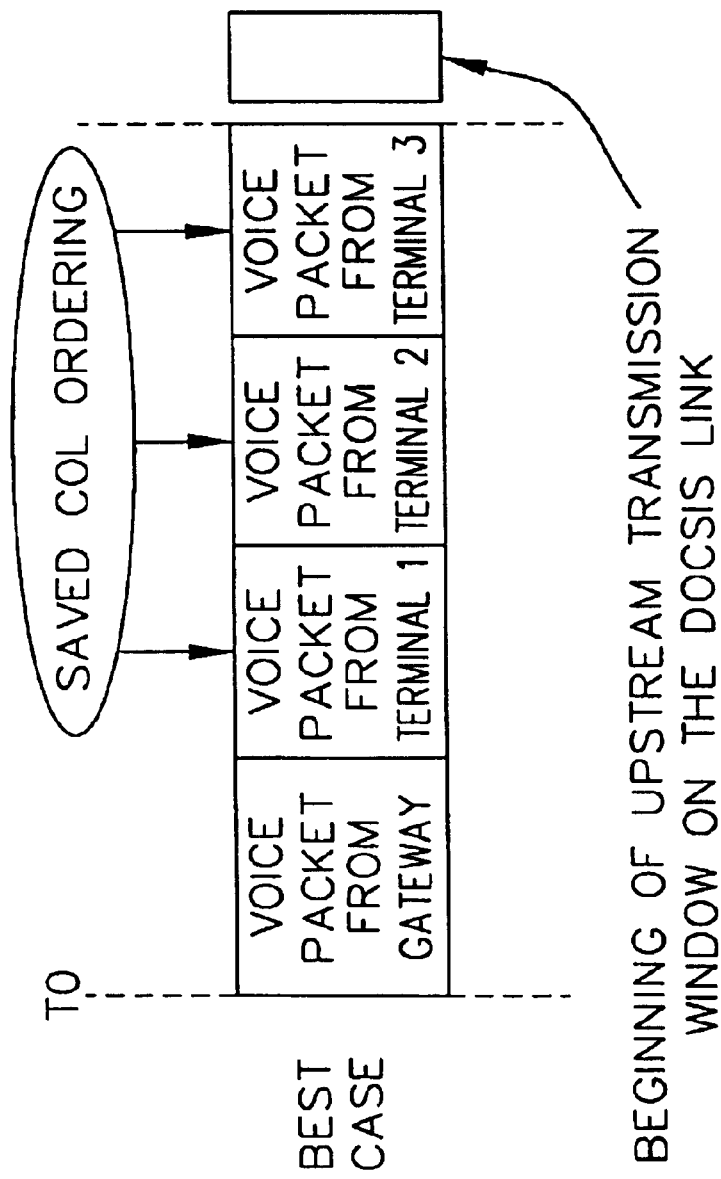
FIG. 14 shows a Best Case in accordance with a further aspect of the present invention.

Referring now to FIG. 14, a third method for eliminating CRA Delay involves Terminals initially using the standard collision resolution method, but on subsequent transmission re-using the transmission ordering obtained without repeating the collision resolution.

In the improved methods that specify the transmission ordering, the timing of the Terminal transmission becomes very predictable, allowing the terminals to minimize the delay between the sampling of the voice signal and the packet transmission on the HPNA network. Without this predictability more buffering would be needed at some point in the transmission path, which increases the average and maximum delay in the network path.

Figure 15:
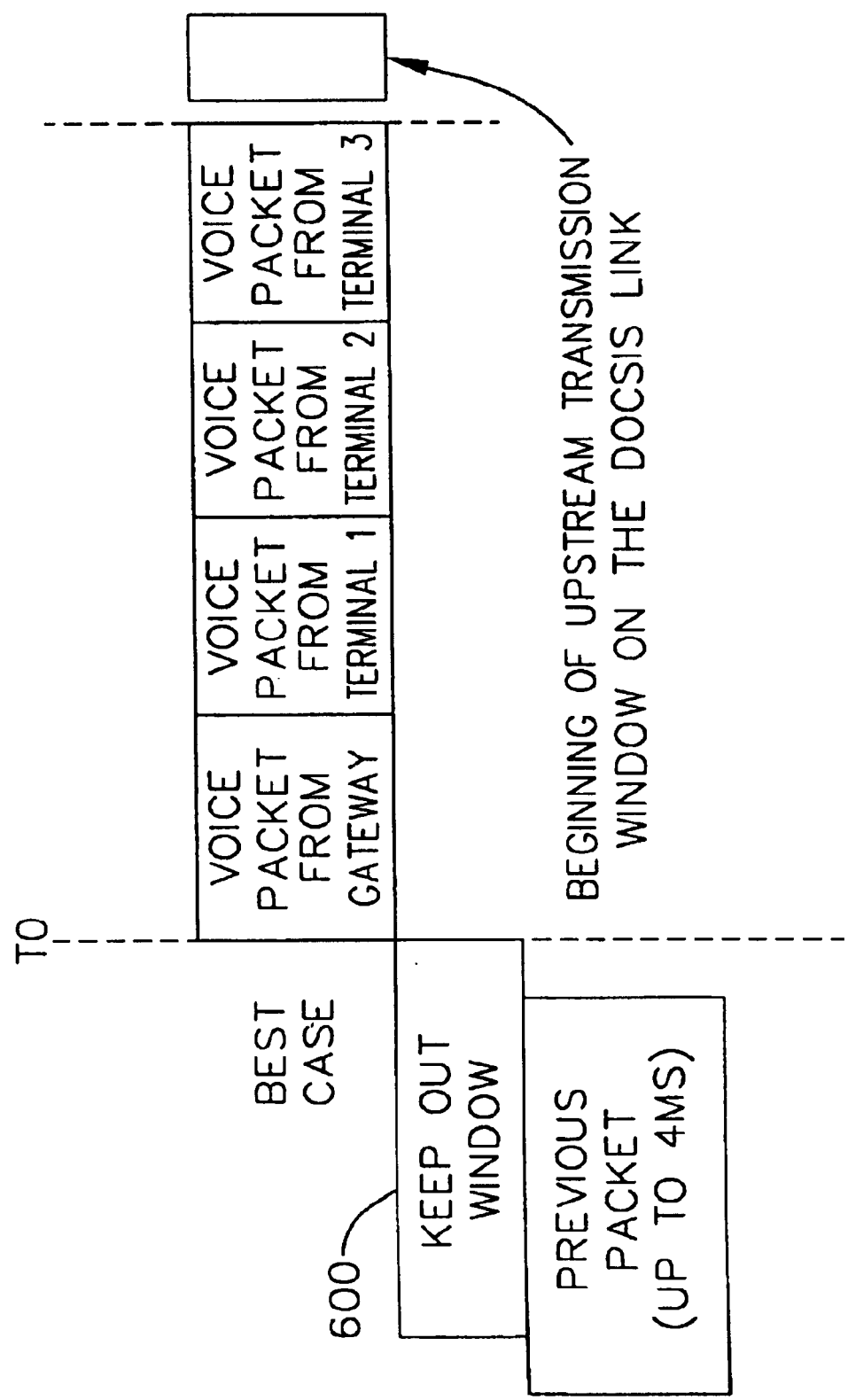
FIG. 15 shows a Best Case in accordance with still another aspect of the present invention.

Now turning to FIG. 15, there is shown the use of a KOW 600, which defers lower-priority (non-packetized voice) transmission from occurring at a time that would cause Basic Access Delay to the Gateway transmission. In one approach, the KOW is established at a point such that the longest legal packet can be transmitted and finished before the scheduled time for the Gateway downstream transmission. In another approach, the KOW is defined as that needed to ensure that the specific transmission from the lower priority station can completed before the Gateway scheduled time, this determination being made by the station using an estimate of the transmission time for the next packet. The transmission time is variable because the variable length nature of packets and the adaptive modulation rate used by HPNA networks. In still another approach, the KOW is suppressed if the network loading exceeds a pre-determined threshold. This allows the network to achieve maximum throughput during peak loads, while presenting low packetized voice latency during unloaded times. Note that KOW depends on all non-packetized voice stations cooperatively recognizing the Gateway transmission times, and in the case of legacy interfaces that don't follow that protocol there could be unwanted delays. A method to address this issue is for the Gateway to attempt transmission in advance of its desired time in order to pre-empt any lower-priority stations, called "busy-keep-out" (BKOW). The packet format in this case consists of a string of PAD values which precede the actual packet contents. Terminals strip off this PAD sequence when receiving the Gateway packet, resulting in the actual packet transmitted at the right time. Note that the BKOW mechanism can be dynamically adjusted by the Gateway to enforce specific performance as needed. If the packetized voice delay is acceptable without BKOW, then the Gateway can turn off the padding. The KOW window can be reduced if all stations cooperatively avoid transmissions longer than a maximum amount, whether because the adaptive modulation achieved short transmission times, or Maximum Transmission Unit (MTU) size was limited by configuration or packet fragmentation. The KOW window can be dynamically sized by estimating the maximum packet transmission length by observations of traffic on the network. The KOW can be reduced if some jitter is allowable, up to some maximum.

What is claimed is:

1. A method of synchronizing one or more synchronous terminals with one or more synchronous endpoints, each synchronous terminal and each synchronous endpoint having an asynchronous communications network coupled between at least one synchronous terminal and at least one synchronous endpoint, comprising:

establishing a synchronization protocol between a synchronous terminal and a synchronous end point by providing a gateway between the asynchronous communications network and the synchronous end point, the gateway communicating with the synchronous terminal over the asynchronous communications network in accordance with the synchronization protocol;

wherein the synchronization protocol includes sending a message from the gateway to the synchronous terminal, the message containing a timestamp identifying a clock associated with the synchronous end point;

wherein the synchronous terminal establishes a clock associated with the synchronous terminal by creating a clock estimate based upon the timestamp message and access jitter expected from the asynchronous communications network such that the clock associated with the synchronous terminal enables packet sampling and transmission onto the asynchronous communications network to and from the synchronous terminal to be synchronized with the clock associated with the synchronous end point.

2. The method of claim 1, wherein an attempted transmission by each terminal over the asynchronous communications network is ordered such that each synchronous terminal attempts to transmit at the same time after the message is sent from the gateway.

3. The method of claim 2, wherein each synchronous terminal retains ordering information from collision resolution cycles.

4. The method of claim 3, wherein the ordering information is used repeatedly for further transmissions in place of collision resolution.

5. The method of claim 1, wherein the synchronization protocol includes establishing keep-out windows for terminals coupled to the asynchronous communications network having a terminal access priority lower than an access priority for the one or more synchronous terminals, the keep-out windows preventing the terminals coupled to the asynchronous communications network having a terminal access priority lower than an access priority for the one or more synchronous terminals from transmitting on the asynchronous communications network before the completion of sending a message from the gateway to the synchronous terminal.

6. The method of claim 1, wherein the access jitter includes one or more of: basic access delay, collision resolution delay, or priority access delay.

7. The method of claim 1, wherein the asynchronous communications network implements HPNA technology.

* * * * *